Figure 1:
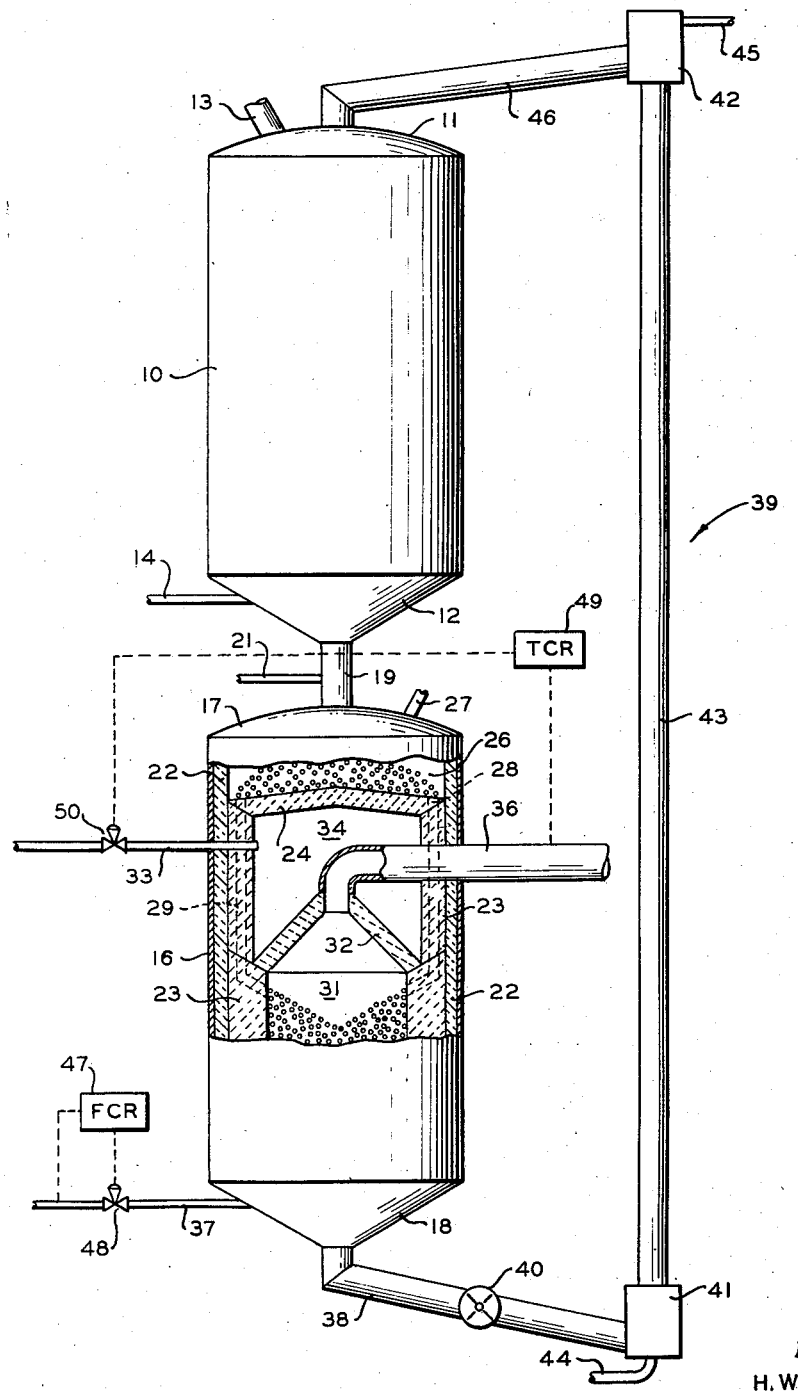

INVENTOR.
H. W. HENNIGAN
BY Hudson and Young
ATTORNEYS

Aug. 11, 1959

H. W. HENNIGAN 2,899,283

HYDROCARBON CONVERSION APPARATUS

Filed July 29, 1954

2 Sheets-Sheet 2

INVENTOR.
H. W. HENNIGAN
BY Hudson and Young
ATTORNEYS

United States Patent Office 2,899,283
Patented Aug. 11, 1959

2,899,283

HYDROCARBON CONVERSION APPARATUS

Henry W. Hennigan, Phillips, Tex., assignor to Phillips Petroleum Company, a corporation of Delaware Application July 29, 1954, Serial No. 446,579

11 Claims. (Cl. 23—284)

This invention relates to the conversion of hydrocarbons. In one of its more specific aspects, it relates to pebble heater apparatus. In another of its more specific aspects, it relates to means for preventing the deposition of carbonaceous materials within the upper portion of the reaction chamber of pebble heater apparatus. In still another of its more specific aspects, it relates to a method for preventing the lay-down of carbon in the upper portion of the reaction chamber of pebble heater apparatus.

Apparatus used in carrying out thermal conversion processes wherein a flowing mass of solid heat exchange material, heated to a high temperature by passing hot combustion gases therethrough in a first direct heat exchange relation, is thereafter caused to contact gaseous reactant materials in a second direct heat exchange relation is generally called pebble heater apparatus. Pebble heater apparatus may be advantageously employed in various processes such as hydrocarbon conversion, gas adsorption, and gas-solid heat exchange in general. A principal use of pebble heater apparatus is in the conversion of hydrocarbons, involving thermal or catalytic processes such as cracking, hydrogenation, dehydrogenation, isomerization, polymerization, oxidation, and the like.

Solid heat exchange material which is conventionally used in pebble heater apparatus is generally called "pebbles." For a more detailed description of the pebbles which can be utilized herein, reference may be had to U.S. Patent No. 2,536,436.

Conventional pebble heater apparatus usually comprises a series of at least two chambers positioned substantially in vertical alignment with one another. The upper and lower chambers are sometimes referred to, respectively, as the pebble heating chamber and the gas reaction chamber. The pebbles are introduced into the upper portion of the pebble heating chamber where they form a moving bed of solid heat exchange material which flows downwardly through the chamber in direct heat exchange with hot gaseous heat exchange material. The hot gas in contacting the pebble mass transfer heat thereto, the effluent gas being removed thereafter from the upper portion of the heating chamber. Hot pebbles are then passed downwardly from the heating chamber through a pebble throat into the gas reaction chamber where they are contacted in countercurrent flow with gaseous reactant material in a second direct heat exchange relation. Effluent gas from the gas reaction chamber is withdrawn from the top portion thereof while relatively cool pebbles gravitate from the lower portion of that chamber and are subsequently recycled to the top portion of the pebble heating chamber.

In the operation of pebble heater apparatus, one of the difficulties encountered arises from the fact that carbonaceous materials tend to deposit in the upper portion of the gas reaction chamber and around and within the gaseous effluent outlet conduit from that chamber. As a result of the carbon lay-down, the gas velocity through the upper portion of the reaction chamber sometimes reaches such proportions that the pebbles are blown out of the chamber through the effluent outlet conduit. By being carried out of the reaction chamber in this manner, the pebbles are damaged by thermal shock on being passed into the pebble heater quench system. The deposition of carbonaceous materials within the effluent outlet conduit of a pebble heater reactor also has a deleterious effect upon pebble heater operation. As carbon deposits build up in this conduit, flow of reaction products from the reactor is substantially retarded and may even be terminated. Because of the descreased rate of flow of reaction products from the reaction chamber, the reactant materials are held in that chamber for a longer residence time, causing a deeper cracking reaction than desired and consequently an accelerated lay-down of carbon within the reaction chamber. A method for eliminating or substantially minimizing the lay-down of carbon in the upper portion of a reactor has been recently proposed by M. O. Kilpatrick in U.S. application, Serial No. 185,437, filed September 18, 1950, now U.S. Patent No. 2,680,706, granted June 8, 1954, whereby an inert gas such as steam is introduced into the reaction chamber in such a manner that a blanket of steam is formed in the upper portion of the chamber. By so blanketing the upper portion of the reaction chamber, products resulting from the conversion of hydrocarbons are prevented from contacting the surface of that portion of the reaction chamber. When operating in this manner, the reaction products are removed from the reactor before they have time to contact the upper portion of the reaction chamber and thereby result in a lay-down of carbon by further conversion of the reaction products. Methods for inhibiting carbon deposition within the gaseous effluent outlet conduit of a pebble heater reactor are disclosed by D. S. Hall and myself in copending U.S. application, Serial No. 423,426, filed April 15, 1954, and by D. S. Hall and M. O. Kilpatrick in copending U.S. application, Serial No. 433,590, filed June 1, 1954. In accordance with this invention, improved means and method are provided for substantially eliminating carbon deposition in the upper portion of the reaction chamber of pebble heater apparatus.

The following are objects of the invention.

It is an object of the present invention to provide an improved hydrocarbon conversion system.

Another object of the invention is to provide an improved pebble heater reaction chamber.

Still another object of the invention is to provide an improved process for the conversion of hydrocarbons.

Yet another object of the invention is to provide means for preventing the deposition of carbonaceous materials on the underneath surface of a pebble heater reactor dome.

A further object of the invention is to provide a method for blanketing with an inert gas the underneath surface of a pebble heater reactor dome so as to inhibit contact between that portion of the dome and the gaseous effluent.

A still further object of the invention is to provide a method for controlling the amount of inert gas supplied to the pebble heater reactor in order to prevent carbon lay-down.

Other and further objects and advantages will become apparent to those skilled in the art upon reference to the following disclosure.

Broadly speaking, the present invention resides in a method and means for inhibiting the deposition of carbonaceous materials on the underneath surface of a pebble heater reactor dome. The carbon deposition is believed to be the result of overcracking of the hydrocarbons on coming in contact with the surface of the reactor dome. It has been found that this lay-down of carbon may be inhibited or substantially eliminated by blanketing the underneath surface of the reactor dome with an inert gas so as to prevent contact between the surface and the gaseous effluent, or by controlling the temperature of that surface coming in contact with the gaseous effluent so as to avoid overcracking of the effluent gas. In accordance with one modification of the invention, a porous dome is provided in the upper portion of a pebble heater reactor. An inert gas such as steam introduced into the chamber formed above the porous dome thereafter passes through the dome forming a blanket of steam on its underneath surface. In another modification of the invention a load supporting dome having a substantially conical, porous inner jacket or liner spaced apart from its underneath surface so as to form a space therebetween is provided in the upper portion of the reactor. An inert gas such as steam is introduced into the space between the load supporting dome and porous jacket and passes through the jacket forming a blanket of steam adjacent its underneath surface. In still another modification of the invention, an impervious inner jacket or liner is provided, and an inert gas is introduced into the space between the load supporting dome and the impervious jacket in order to control the temperature of the underneath surface of the jacket. In yet another modification of the invention, a porous or impervious tube disposed within the effluent outlet conduit is utilized in combination with the inner jacket or liner in order to inhibit carbon deposition within the effluent outlet conduit of a pebble heater reactor.

Figure 2:
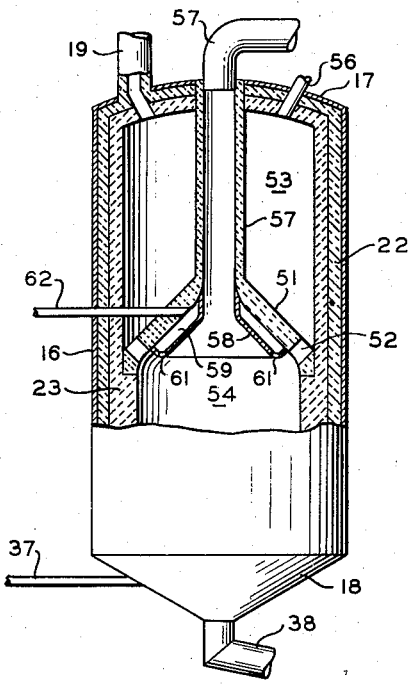
Figure 3:
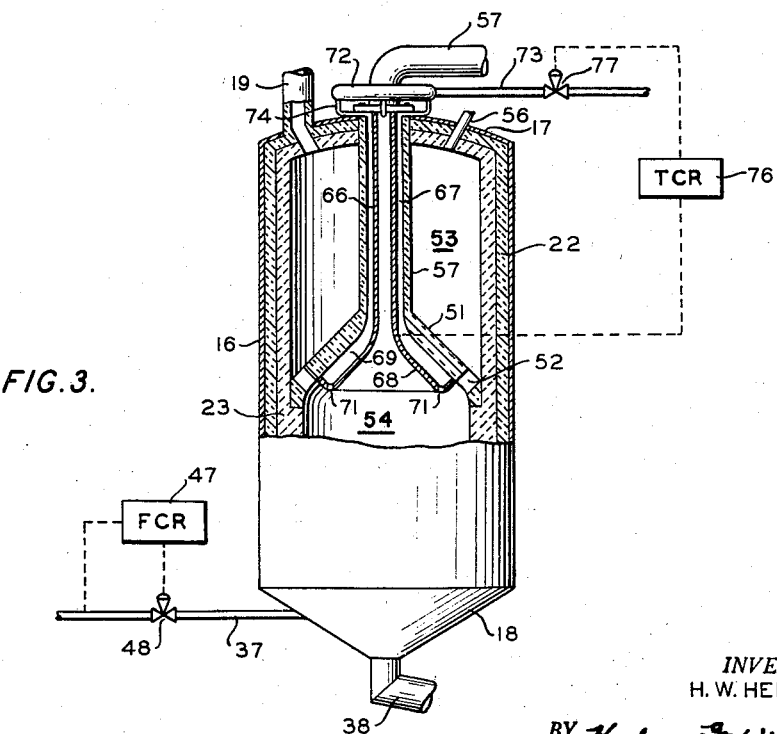

A more complete understanding of the invention may be obtained by reference to the following description and the drawing, in which:

Figure 1 is an elevation, partly in section, of pebble heater apparatus, illustrating one modification of the invention; and Figures 2 and 3 are elevations, partly in section, of pebble heater reactors, illustrating other modifications of the invention.

Referring to the drawing and in particular to Figure 1, pebble heater apparatus is illustrated which comprises an upright elongated shell 10 closed at its upper and lower ends by closure members 11 and 12, respectively. Gaseous effluent outlet conduit 13 extends from the upper portion of the pebble heating chamber formed within shell 10 while feed material inlet conduit 14 is provided in the lower portion of that chamber. Upright elongated shell 16, closed at its upper and lower ends by closure members 17 and 18, respectively, is disposed below shell 10. Pebble conduit means, such as conduit 19, or a plurality of such conduits, extends between closure member 12 of shell 10 and closure member 17 of shell 16. Line 21 connected to conduit 19 provides means for introducing an inert sealing gas, such as steam, into that conduit.

Shell 16 is lined with insulating material 22 and high temperature refractory material 23. Pebble inlet conduit 19 as shown is axially positioned in top closure member 17 of shell 16 and extends therethrough to permit the flow of hot pebbles onto dome or baffle member 24 whose upper side is convex to aid the flow of pebbles to its periphery. Dome 24 is in the form of a load supporting dome preferably constructed from refractory bricks each in the form of a plug tapering inwardly on all four lateral sides from top to bottom and having a convex upper surface. Dome 24 is disposed in spaced apart relation to pebble inlet 19 to provide a surge chamber 26 in the upper portion of the pebble heater reactor. Gas inlet line 27 attached to closure member 17 communicates with surge chamber 26. The periphery of dome 24, which is supported by refractory material 23 lining the interior of the shell, is provided with a plurality of pebble outlets 28 connected by pebble conduits or passageways 29, formed in refractory material 23, to reaction chamber 31.

A substantially conical dome or baffle member 32, supported at its periphery by refractory material 23 lining shell 16, is disposed within the shell intermediate its ends. Dome 32 is formed of a porous material such as porous steel or a porous refractory material so as to permit the passage of an inert gas therethrough. It is also within the scope of the invention to utilize a dome formed of an impervious material and having small diameter holes formed therein for passage of an inert gas. Gaseous inlet conduit 33 provides means for introducing an inert gas into chamber 34 formed between dome 24 and porous dome 32. Effluent outlet conduit 36, which may be advantageously constructed of steel, extends from the apex of dome 32 through chamber 34 to the exterior of the shell. It is also within the scope of the invention to form of a porous material that portion of effluent outlet conduit 36 which is disposed within chamber 34.

A reactant material inlet conduit 37 is provided in the lower portion of shell 16. Pebble outlet conduit 38, which extends downwardly from closure member 18 of shell 16 is connected to the lower portion of elevator 39. Pebble feeder 40 located intermediate the ends of pebble outlet conduit 38 may be one of the conventional pebble feeders such as a star valve, a gate valve, a rotatable table feeder, or the like. As illustrated, elevator 39 is of the gas lift type, comprising a lower pebble engaging chamber 41 and an upper disengaging chamber 42 connected by an upright gas lift conduit 43. Lift gas inlet line 44 is connected to the lower end of engaging chamber 41 while effluent outlet 45 is provided in the upper portion of disengaging chamber 42. Pebble inlet conduit 46 extends between disengaging chamber 42 and closure member 11 of shell 10.

Flow controller-recorder 47, operatively connected to an orifice in reactant material inlet conduit 37 and to valve 48 in the same conduit, provides means for regulating the flow of reactant material to the reaction chamber. Temperature controller-recorder 49 is operatively connected to a thermocouple in effluent outlet conduit 36 and to valve 50 in gaseous inlet conduit 33.

Referring to Figure 2 of the drawing, there is illustrated a pebble heater reactor which incorporates a preferred modification of the present invention. Identical reference numerals have been utilized in order to designate elements corresponding to those described in conjunction with Figure 1. It is noted that pebble conduit means 19 is located at the periphery of closure member 17 rather than axially as in Figure 1. A substantailly conical dome 51, in the form of a load supporting dome constructed similarly to dome 24 of Figure 1, is positioned with shell 16 intermediate its ends. Dome 51 is supported at its periphery by refractory material 23 lining the interior of shell 16. A plurality of pebble conduit means 52 disposed around the lower periphery of conical dome 51 communicate pebble soaking chamber 53, formed above dome 51, with reaction chamber 54 formed below dome 51. Gaseous inlet means 56, which communicates with pebble soaking chamber 53, provdes means for introducing an inert gas into that chamber. Gaseous effluent outlet conduit 57 extends upwardly from the apex of dome 51 through pebble soaking chamber 53 to the exterior of shell 16. A porous, inner jacket or liner 58 is disposed beneath dome 51 and spaced apart therefrom so as to form space 59. The upper and lower ends of the jacket abut against dome 51. Jacket 58 is formed of a porous material such as porous steel or a porous refractory material, or it may be constructed of an impervious material having small diameter holes formed therein for passage of an inert gas therethrough. The lower end portion of jacket 58 may also be provided with a plurality of outlets such as drilled holes 61 at points adjacent the junction of the jacket with dome 51. Gaseous inlet line 62 provides means for introducing an inert gas into space 59 formed between dome 51 and jacket 58. It is also within the scope of the present invention to form inner jacket 58 of a non-porous material such as stainless steel in which case the temperature of the inner surface of the jacket is controlled so as to prevent overcracking of the gaseous effluent.

Referring to Figure 3 of the drawing a pebble heater reactor is shown which incorporates still another modification of the invention. Identical reference numerals have been utilized to designate elements previously described in conjunction with Figures 1 and 2. That portion of gaseous effluent outlet conduit 57 disposed within shell 16 has a tube 66 positioned therein, thereby forming an annular space 67 between the tube and the effluent outlet conduit. The lower end of tube 66 is attached to the upper end of inner jacket or liner 68 which is positioned beneath and spaced apart from load supporting dome 51 so as to form a space 69 between the dome and the jacket. The lower end of the jacket abuts against dome 51. Tube 66 and jacket 68 are constructed of a porous material such as described above with reference to Figures 1 and 2. It is also within the contemplation of the invention to form tube 66 and/or jacket 68 of a non-porous material such as stainless steel in which case a plurality of outlets such as drilled holes 71 are provided in the lower end portion of jacket 68 adjacent its juncture with dome 51. Outlets 71 may also be provided when jacket 68 is constructed of a porous material. A header member 72 having an inlet line 73 connected thereto is positioned above shell 16. A plurality of outlet lines 74 lead from header member 72 to annular space 67, thereby providing means for supplying an inert gas to that space.

When the reactor is provided with a non-porous inner jacket and tube, control means such as that illustrated in Figure 3 is employed. Temperature controller-recorder 76 is operatively connected to a thermocouple adapted to measure the surface temperature of inner jacket 68 and to valve 77 contained in inlet line 73. With a porous inner jacket and tube, a control system similar to that shown in Figure 1 is used. It is to be understood that the control systems of Figures 1 and 3, as applicable, can be used with the reactor of Figure 2.

In the operation of the apparatus of Figure 1, pebbles introduced into the upper portion of the heating chamber formed within shell 10 are gravitated therethrough as a contiguous mass of pebbles. A heating material is passed into the lower portion of the heating chamber through inlet conduit 14. The heating material may be fuel and air, the fuel being burned upon the surface of the pebbles within the heating chamber or below or around the pebble bed. The heating material may also be a hot combustion gas resulting from the combustion of a fuel outside the heating chamber. The hot combustion gases which are passed upwardly through the gravitating mass of pebbles within the heating chamber are removed from the chamber through gaseous effluent outlet conduit 13. The gravitating pebbles are heated by direct heat exchange with the hot combustion gases to temperatures generally in the approximate range of 1200° F. to 3200° F., depending upon the particular reaction being carried out within the pebble heater apparatus. The hot pebbles are gravitated through conduit 19 into pebble surge chamber 26 formed above dome 24 in the upper portion of shell 16. An inert sealing gas, such as steam, is passed into conduit 19 through line 21 in order to prevent downward flow of combustion gases from the heating chamber and upward flow of gases from the reactor. The temperature of the pebbles entering surge chamber 26 is generally about 100° F. to 500° F. below the average temperature of the combustion gases entering the pebble heating chamber.

The pebbles remain momentarily within surge chamber 26 flowing downwardly over the convex surface of dome 24 and through pebble conduits 28 into passageways 29. The hot pebbles enter reaction chamber 31 through pebble passageways 29 as a plurality of pebble streams. An inert gas such as steam may be introduced into pebble surge chamber 26 through gas inlet line 27 in order to equalize any temperature differential existing between the heated pebbles coming from the pebble heating chamber. Gaseous reactant materials introduced into reaction chamber 31 through inlet conduit 37 contact the gravitating mass of hot pebbles and undergo reaction. The product containing gas withdrawn through gaseous effluent outlet conduit 36 is thereafter passed to quenching means and a purification system, not shown. The cooled pebbles gravitate from the bottom of the reaction chamber through pebble outlet conduit 38 and then flow into engaging chamber 41 at a rate dependent upon the operation of pebble feeder 40. In the engaging chamber, the pebbles are contacted by a stream of lift gas, such as air, introduced into the lower end thereof through lift gas inlet line 44. Pebbles are raised by the air stream through gas lift conduit 43 to the top of elevator 39 where the pebbles fall out of the air stream in disengaging chamber 42. The pebbles flow downwardly from disengaging chamber 42 through pebble inlet conduit 46 into the upper portion of the pebble heating chamber. The lift gas is withdrawn from disengaging chamber 42 through gaseous effluent conduit 45.

During the operation of the pebble heater apparatus as described above, carbonaceous materials may tend to deposit on the lower side of dome 32 and around the inlet to gaseous effluent outlet conduit 36. In order to inhibit the deposition of carbon, an inert gas is introduced into chamber 35 through inlet line 33. It is preferred to utilize steam as the inert gas, but other gases may be utilized such as nitrogen, ethane, methane or any light inert or highly refractory gas. The steam introduced through inlet line 33 passes through porous dome 32, forming a blanket of steam adjacent the underneath surface of the dome. The blanket of steam so formed tends to move along the surface of the dome and passes out of the reaction chamber through effluent outlet conduit 36. By forming a blanket of steam adjacent the underneath surface of dome 32, contact between that surface and the gaseous effluent is inhibited. By preventing contact between the gaseous effluent and the underneath surface of dome 32, overcracking of the gaseous effluent is prevented and the formation of carbonaceous material on that surface is substantially eliminated.

It has also been found in pebble heater operation that carbon may tend to deposit on the inner surface of the effluent outlet conduit. This tendency is especially pronounced in reactors in which at least a portion of the effluent outlet conduit is disposed within the reactor. It is believed that this tendency to carbon formation is primarily the result of overcracking resulting from contact between the effluent gas and the gaseous effluent conduit which is at a temperature higher than that of the gaseous effluent. In accordance with the present invention, as illustrated in Figure 1, means are provided for maintaining the temperature of the gaseous effluent conduit at approximately, but no higher than, that of the gaseous effluent. Accordingly, the steam introduced into chamber 34 through gaseous inlet line 33 cools gaseous effluent conduit 36 to a temperature somewhat below that of the gaseous effluent. By operating in this manner, the deposition of carbonaceous materials is substantially eliminated within the gaseous effluent conduit as well as upon the underneath surface of dome 32. When the portion of conduit 36 disposed within chamber 34 is formed of a porous material, a part of the steam introduced into the chamber passes through the porous portion of the conduit. There is thus formed a blanket of steam along the inner surface of this conduit, which prevents contact between the reaction products and the inner surface.

When utilizing the pebble heater reactor of Figure 2, pebbles are introduced into pebble soaking chamber 53 through pebble inlet conduit means 19. The pebbles reside momentarily within pebble soaking chamber 53 and thereafter pass through pebble conduit means 52 formed around the periphery of dome 51 as a plurality of streams of pebbles into reaction chamber 54. An inert gas introduced through inlet means 56 contacts the pebbles within pebble soaking chamber 53 and thereafter passes through pebble conduits 52 into reaction chamber 54. By contacting the pebbles with an inert gas in chamber 53, any temperature differential which may exist between the pebbles is substantially equalized. The inert gas so passed into the reaction chamber tends to sweep the lower or underneath surface of dome 51, thereby forming a moving film adjacent that surface. An inert gas, similar to that passed into pebble soaking chamber 53 and preferably steam as discussed in conjunction with Figure 1, is passed through inlet line 62 into space 59 formed between dome 51 and porous inner jacket 58. The steam so introduced into space 59 passes through porous jacket 58, thereby augmenting the steam passed into the reaction chamber from pebble soaking chamber 53 through pebble conduit means 52 and forming a dense blanket of steam adjacent the underneath surface of jacket 58. By forming a blanket of steam in this manner, contact between the jacket and the gaseous effluent is inhibited, thereby substantially eliminating carbon lay-down in the upper portion of the reaction chamber. As previously noted, the blanket of steam maintained adjacent the underneath surface of jacket 58 moves along that surface and subsequently passes out of the reaction chamber along the with the gaseous effluent.

When utilizing a jacket 58 formed of an impervious material such as stainless steel, steam is introduced into space 59 in an amount sufficient to maintain the inner surface temperature of the jacket below that of the gaseous effluent. The steam so passed into space 59 enters reaction chamber 54 through outlets 61 and thereafter leaves that chamber with the effluent gas. By operating in this manner, overcracking of the effluent gas on contacting jacket 58 and consequent lay-down of carbon thereon is prevented.

The operation of the apparatus of Figure 3 is in many respects similar to that of Figure 2. As discussed hereinabove, the effluent outlet conduit is provided with a tube which may be impervious or porous and which is attached to the upper end of an inner jacket or liner 68 which may also be impervious or porous. When utilizing both an impervious tube and jacket, an inert gas such as steam is passed from header member 72 into annular space 67 through lines 74. The steam fills annular space 67 passing downwardly therethrough into space 69 formed between dome 51 and jacket 68. The steam thereafter fills space 69 and then passes into reaction chamber 54 through outlets 71 in jacket 68. The amount of steam supplied to annular space 67 and space 69 is controlled so as to maintain the inner surface temperature of tube 66 and jacket 68 at approximately, but no higher than, that of the effluent gas. By so controlling the temperature of tube 66 and jacket 68, overcracking of the gaseous effluent when it comes in contact with the inner surface of these elements is prevented. Furthermore, by maintaining the temperature at approximately that of the effluent gas, tar and oil carried by the reaction products are prevented from condensing on the inner surface of the tube and jacket, which may result if the tube is allowed to become too cool. Accordingly, by controlling the flow of steam to annular space 67 and space 69, it is possible to avoid a surface which may be either too hot or too cool.

In some cases it may happen that carbonaceous materials will build up within the gaseous effluent outlet conduit and on the underneath surface of jacket 68 even though an inert gas is supplied to annular space 67 and space 69 as described above. While it is desirable to maintain pebble heater operating conditions as uniform as possible, it has been found that variations therein will result from a variety of causes, e.g., inadvertent changes in hydrocarbon feed rate, in pebble flow rate, in pebble temperature, or in the supply of the inert gas to annular space 67 and space 69. When utilizing an impervious steel tube 66 and jacket 68, such variations in operating conditions will cause the tube and jacket to alternately expand and contract. This expansion and contraction of the tube and jacket results in the cracking and breaking up of any deposited carbon which is then carried out of the reactor along with the effluent gas. It may be undesirable, however, to rely upon the occurrence of non-uniform operating conditions in order to effect expansion and contraction of the tube and jacket so as to remove carbon deposited thereon. Accordingly, in accordance with a preferred modification of the invention, flow of inert gas to annular space 67 and space 69 is intermittently varied so as to cause alternate expansion and contraction of the tube and jacket. Any carbon deposits are thereby broken up and dislodged from the surfaces of the tube and jacket, the carbon subsequently passing out of the reactor along with the gaseous effluent. This aspect of the invention is especially applicable to a reactor having a metallic tube and/or jacket which readily expands and contracts with temperature variations.

When utilizing a porous tube 66 and a porous jacket 68, the steam introduced into annular space 67 through header member 72 and lines 74 passes downwardly therethrough into space 69. The steam passes from annular space 67 and space 69 through porous tube 66 and porous jacket 68, forming a blanket of steam along the inner surfaces of these elements. By maintaining a sufficient supply of steam to annular space 67 and space 69, a moving film of steam can be continuously maintained so that contact between the reaction products and the inner surfaces of tube 66 and jacket 68 is inhibited. In this manner, overcracking of the gaseous effluent is prevented, thereby substantially eliminating the formation of carbon on the underneath surface of the reactor dome and on the inner surface of the gaseous effluent outlet conduit.

The amount of steam supplied in order to inhibit carbon deposition is dependent upon several factors which bear a direct relation to the relative tendency of carbon to deposit within the pebble heater reactor. The higher the molecular weight of the hydrocarbon feed charged to the reactor, the greater the amount of steam required to inhibit carbon deposition. Still again, the lower the hydrocarbon feed rate the greater the amount of steam needed since a deeper cracking reaction results from the longer residence time of the hydrocarbons within the reactor. Furthermore, the velocity of the gaseous effluent leaving the reactor is decreased by lower feed rates, thereby allowing the effluent to remain within the reactor for a longer time than when higher feed rates are employed.

In the practice of hydrocarbon conversion processes, the introduction of process steam into the reactor along with the hydrocarbon feed has been found to be desirable. The amount of steam charged to the reactor in this manner varies over a wide range depending on the particular reaction being carried out. For example, in the production of ethylene, the mol ratio of process steam to hydrocarbon feed may be in the range of 1:1 to 2:1 while in the production of acetylene it may be desirable to go as high as 4:1 and higher. In general, the mol ratio of process steam to hydrocarbon feed will be in the range of ½:1 to 8:1. With respect to the amount of steam supplied to the reactor to inhibit carbon deposition, the greater the amount of process steam supplied to the reactor with the hydrocarbon feed the less the amount of steam required to inhibit carbon deposition. This condition arises from the fact that the process steam dilutes the gaseous effluent and also results in an increase in the velocity of the effluent gas leaving the reactor. It should be apparent, therefore, that the tendency of carbon to deposit on the underneath surface of the reactor dome and within the effluent outlet conduit is less when utilizing relatively greater amounts of process steam.

The amount of steam necessary to prevent carbon formation also depends upon the temperature of the gaseous effluent. In accordance with another preferred modification of the invention as illustrated in Figure 1, means are provided for automatically controlling the amount of steam supplied to chamber 34. When charging hydrocarbon feed of constant composition and process steam to the reactor at a constant rate, the quantity of steam supplied to chamber 34 varies in proportion to the temperature of the gaseous effluent. The amount of steam supplied to chamber 34 for the purpose of inhibiting carbon formation on the underneath surface of porous dome 32 will generally vary within the range of 400 pounds per hour to 1400 pounds per hour. The amount actually supplied is as previously discussed dependent upon the composition of the feed and the rate of supply of the feed and process steam. In accordance with the modification of the invention illustrated in Figure 1, flow controller recorder 47 is given an initial setting at which it is desired to introduce a hydrocarbon feed of constant composition and process steam into the reaction chamber. By controlling the temperature of the pebbles and their rate of flow through reaction chamber 31, the desired conversion conditions are maintained within that chamber for the specific process being carried out. In the production of ethylene from light hydrocarbons such as ethane or propane, pebble temperatures are generally in the range of 1200° F. to 1800° F. while in the production of acetylene temperatures in the range of 1800° F. to 3000° F. are desirable. With pebbles at a constant temperature flowing at a constant rate, the temperature of the effluent gas remains substantially constant. For a given set of operating conditions, temperature controller recorder 49 is given an initial setting which corresponds to the effluent temperature at those conditions while valve 50 operatively connected to the controller recorder is adjusted so that the desired amount of steam is supplied to chamber 34. If the temperature of the effluent gas increases or decreases as a result of variations in pebble temperature or pebble flow rate, temperature controller recorder 49 operates to increase or decrease the opening of valve 50, thereby controlling the amount of steam supplied to chamber 34. In general, it is desirable to increase or decrease the amount of steam by between 10 and 50 percent by weight, and preferably about 25 percent by weight, for each 100° F. increase or decrease in the temperature of the gaseous effluent.

The method of control as described above is especially applicable when utilizing a porous dome as shown in Figure 1 or when using a porous inner jacket and tube as illustrated in Figures 2 and 3. When utilizing an inner jacket or tube formed of an impervious material such as stainless steel, the amount of steam supplied to the reactor in order to inhibit carbon formation is controlled in accordance with the surface temperature of the inner jacket or tube. Accordingly, referring to Figure 3 of the drawing, a thermocouple operatively connected to temperature controller recorder 76 is utilized to continuously measure the temperature of inner jacket 68. Temperature controller recorder 76, which is given the temperature setting at which it is desired to maintain the underneath surface of jacket 68, thereafter continuously regulates valve 77 so that steam is supplied to annular space 67 and space 69 at the rate necessary to maintain the tube and the jacket at the desired temperature. In general, it is preferred to control the flow of steam so that the temperature of the cooled jacket is no higher than that of the effluent gas, but not more than 200° F. below the temperature of that gas. By so controlling the temperature of the tube and liner, overcracking of the effluent gas is prevented when that gas comes in contact with the jacket and liner. This method of control can also be used in conjunction with the operation of the reactor of Figure 2 when jacket 58 of that reactor is formed of a nonporous material.

A more complete understanding of the invention can be obtained by reference to the following example which is not intended, however, to be unduly limitative of the invention.

A gaseous hydrocarbon feed containing about 60 mol percent ethane and 6.6 mol percent propane is supplied to a pebble heater reactor similar to that shown in Figure 1 at a rate of about 40,000 s.c.f.h. Pebbles are circulated through the pebble heater apparatus at the rate of about 36,000 pounds per hour, and the pebbles enter the reactor at a temperature of about 1800° F. The hydrocarbon feed contacts the hot pebbles in countercurrent flow and is cracked with an ethane conversion of 86.0 percent and a propane conversion of 94.0 percent. The pebbles leave the reactor at a temperature of about 950° F. Steam is supplied to the pebble surge chamber at the rate of about 400 pounds per hour. The temperature of the effluent gas removed from the reactor through the effluent outlet conduit is about 1550° F. Steam is introduced into the chamber formed between the two domes at the rate of about 800 pounds per hour. The steam so introduced into the chamber passes through the porous dome, forming a blanket of steam on the underneath surface of the dome and thereby substantially preventing the deposition of carbon on that surface. The steam passed into the chamber formed between the two domes maintains the effluent outlet conduit, which passes through the same chamber, at a temperature below that of the gaseous effluent. By so maintaining the temperature of the gaseous effluent outlet conduit, overcracking of the gaseous effluent on contact with this conduit is prevented thereby substantially eliminating the formation of carbon within the conduit.

It will be apparent that in accordance with the present invention a means and method are provided for preventing the deposition of carbonaceous materials within the gaseous effluent conduit and on the underneath surface of a reactor dome of a pebble heater reactor. By operating in the manner described hereinbefore, continuous operation of the pebble heater apparatus is made possible without resort to the expedient of taking the pebble heater apparatus off stream to effect removal of carbon. As will be evident to those skilled in the art, various modifications of the invention may be made or followed in the light of the foregoing disclosure and description without departing from the spirit or scope of the disclosure.

I claim:

1. A pebble heat exchange chamber which comprises, in combination, a closed, upright shell; pebble inlet conduit means in the upper portion of said shell; pebble outlet conduit means in the lower portion of said shell; fluid inlet conduit means in the lower portion of said shell; a dome disposed in said shell intermediate its ends and supported at its periphery by the walls of said shell; a baffle member disposed beneath and spaced apart from said dome so as to form a space therebetween; conduit means for passing pebbles from the upper portion of said shell above said dome into the lower portion of said chamber formed below said baffle member; effluent outlet conduit means extending from said baffle member to the exterior of said shell and communicating with the lower portion of said shell; inert gas inlet conduit means for introducing an inert gas into said space between said dome and said baffle member; temperature control means operatively connected to one of said baffle members and said effluent outlet conduit means and responsive to a predetermined temperature therein; and flow control means operatively connected to said temperature control means and said inert gas inlet conduit means, and adapted to increase the flow of said inert gas when the temperature of said one of said baffle member and said effluent outlet conduit means reaches a predetermined value.

2. A pebble heat exchange chamber which comprises, in combination, a closed, upright shell; pebble inlet conduit means in the upper portion of said shell; pebble outlet conduit means in the lower portion of said shell; fluid inlet conduit means in the lower portion of said shell; a first baffle member disposed in the upper portion of said shell and supported at its periphery by the walls of said shell; a second baffle member spaced downwardly from said first baffle member and supported at its periphery by the walls of said shell, said second baffle member being formed of a porous material; pebble conduit means for passing pebbles from the chamber formed above said first baffle member to the chamber formed below said second baffle member; effluent outlet conduit means extending from said second baffle member to the exterior of said shell and communicating with the lower portion of said shell; inert gas inlet conduit means for introducing an inert gas into the chamber formed between said first and second baffle members; temperature control means operatively connected to said effluent outlet conduit means and responsive to a predetermined temperature therein; and flow control means operatively connected to said temperature control means and said inert gas conduit means, and adapted to increase the flow of said inert gas when the temperature in said effluent outlet conduit means reaches said predetermined value.

3. A pebble heat exchange chamber which comprises, in combination, a closed, upright shell; pebble inlet conduit means in the upper portion of said shell; pebble outlet conduit means in the lower portion of said shell; fluid inlet conduit means in the lower portion of said shell; a dome disposed in said shell intermediate its ends and supported at its periphery by the walls of said shell; a substantially conical baffle member disposed in said shell and supported at its periphery by the walls of said shell; said baffle member being formed of a porous material, said baffle member being disposed beneath and spaced apart from said dome so as to form a space therebetween; a plurality of pebble conduit means spaced around the periphery of said conical baffle member and communicating the upper chamber formed above said dome with the lower chamber formed below said conical baffle member; effluent outlet conduit means extending from the apex of said conical baffle member through said upper chamber to the exterior of said shell and communicating with the lower portion of said shell; the portion of said effluent outlet conduit means disposed within said upper chamber being formed of a porous material; inert gas inlet conduit means for introducing an inert gas into said upper chamber; temperature control means operatively connected to said effluent outlet conduit means and responsive to a predetermined temperature therein; and flow control means operatively connected to said temperature control means and said inert gas inlet conduit means, and adapted to increase the flow of said inert gas when the temperature in said effluent outlet conduit means reaches said predetermined value.

4. A pebble heat exchange chamber which comprises, in combination, a closed, upright shell; pebble inlet conduit means in the upper portion of said shell; pebble outlet conduit means in the lower portion of said shell; fluid inlet conduit means in the lower portion of said shell; a laterally disposed dome positioned within said shell intermediate its ends and supported at its periphery by the walls of said shell; an inner liner disposed beneath and spaced apart from said dome so as to form a space therebetween; inert gas inlet conduit means communicating with said space; pebble conduit means communicating the upper chamber formed above said dome with the lower chamber formed below said liner; effluent outlet conduit means extending from the upper portion of said dome to the exterior of said shell and communicating with the lower portion of said shell; temperature control means operatively connected to one of said inner liner and said effluent outlet conduit means and responsive to a predetermined temperature thereof; and flow control means operatively connected to said temperature control means and said inert gas inlet conduit means, said flow control means being adapted to increase the flow of said inert gas when the temperature of one of said inner liner and said effluent outlet conduit means reaches said predetermined value.

5. The pebble heat exchange chamber of claim 4 in which said liner is formed of a non-porous material and the lower portion of said liner is provided with gas outlet conduit means communicating said space with said lower chamber, and wherein said temperature control means is operatively connected to said inner liner and said flow control means is controlled in response to the surface temperature thereof.

6. The pebble heat exchange chamber of claim 4 in which said liner is formed of a porous material, and wherein said temperature control means is operatively connected to said effluent outlet conduit means and said flow control means is controlled in response to the temperature therein.

7. A pebble heat exchange chamber which comprises, in combination, a closed, upright shell; pebble inlet conduit means in the upper portion of said shell; fluid inlet conduit means in the lower portion of said shell; pebble outlet conduit means in the lower portion of said shell; a laterally disposed dome positioned within said shell intermediate its ends and supported at its periphery by the walls of said shell; an effluent outlet conduit extending from the upper portion of said dome to the exterior of said shell and communicating with the lower portion of said shell; an inner liner formed of porous material and disposed beneath and spaced apart from said dome so as to form a substantially conical space therebetween; an inner tube formed of porous material connected to the upper portion of said liner and positioned within that portion of said effluent outlet conduit disposed within said shell so as to form an annular space therebetween, said annular space being open to said conical space; inert gas inlet conduit means communicating with said annular space; pebble conduit means communicating the upper chamber formed above said dome with the lower chamber formed below said dome; temperature control means operatively connected to one of said inner liner and said effluent outlet conduit and responsive to a predetermined temperature thereof; flow control means operatively connected to said temperature control means and said inert gas inlet means, and adapted to increase the flow of said inert gas into said conical space when the temperature of one of said inner liner and said effluent outlet conduit reaches said predetermined value.

8. A pebble heat exchange chamber which comprises, in combination, a closed, upright shell; pebble inlet conduit means in the upper portion of said shell; pebble outlet conduit means in the lower portion of said shell; fluid inlet conduit means in the lower portion of said shell; a laterally disposed dome positioned within said shell intermediate its ends and supported at its periphery by the walls of said shell; an effluent outlet conduit extending from the upper portion of said dome to the exterior of said shell and communicating with the lower portion of said shell; an inner liner formed of non-porous material and disposed beneath and spaced from said dome so as to form a substantially conical space therebetween, the lower portion of said liner being provided with gas outlet means communicating said conical space with said lower chamber; an inner tube formed of non-porous material connected to the upper portion of said liner and positioned within that portion of said effluent outlet conduit disposed within said shell so as to form an annular space therebetween, said annular space being open to said conical space; inert gas inlet conduit means communicating with said annular space; pebble conduit means communicating the upper chamber formed above said dome with the lower chamber formed below said dome; temperature control means operatively connected to one of said inner liner and inner tube and responsive to a predetermined temperature thereof; and flow control means operatively connected to said temperature control means and said inert gas inlet conduit means, and adapted to increase the flow of said inert gas when said predetermined temperature is reached.

9. A pebble heat exchange chamber which comprises, in combination, a closed upright shell; pebble inlet conduit means in the upper portion of said shell; pebble outlet conduit means in the lower portion of said shell; fluid inlet conduit means in the lower portion of said shell; a laterally disposed substantially conical dome positioned within said shell intermediate its ends and supported at its periphery by the walls of said shell; an effluent outlet conduit extending from the upper portion of said dome to the exterior of said shell and communicating with the lower portion of said shell; an inner annular liner disposed beneath and spaced apart from said dome so as to form a substantially conical space therebetween, said liner secured at its ends to said dome; inert gas inlet conduit means communicating with said conical space; temperature control means operatively connected to one of said inner liner and said effluent outlet conduit and responsive to a predetermined temperature thereof; flow control means operatively connected to said temperature control means and said inert gas inlet means, and adapted to increase the flow of said inert gas into said conical space when the temperature of one of said inner liner and said effluent outlet conduit reaches said predetermined temperature; and pebble conduit means communicating the upper chamber formed above said dome with the lower chamber formed below said dome.

10. The pebble heat exchange chamber of claim 9 in which said inner liner is formed of a non-porous material and the lower portion of said liner is provided with gas outlet means communicating said conical space with said lower chamber, and wherein said temperature control means is connected to said inner liner and said flow control means is controlled in response to the surface temperature thereof.

11. The pebble heat exchange chamber of claim 9 in which said inner liner is formed of a porous material, and wherein said temperature control means is connected to said effluent outlet conduit means and said flow control means is controlled in response to the surface to the temperature thereof.

References Cited in the file of this patent

UNITED STATES PATENTS

| | | |
|---|---|---|
| 2,431,632 | Brandt | Nov. 25, 1947 |
| 2,672,488 | Jones | Mar. 16, 1954 |
| 2,719,818 | Findlay | Oct. 4, 1955 |